United States Patent
Enjalbert et al.

(10) Patent No.: US 7,179,857 B2
(45) Date of Patent: Feb. 20, 2007

(54) USE OF TITANIUM DIOXIDE AS ANTI-UV AGENT IN A RUBBER COMPOSITION

(75) Inventors: Catherine Enjalbert, Saint Leu la Forêt (FR); Dominique Labarre, Neuilly sur Seine (FR)

(73) Assignee: Rhodia Chimie, Aubervilliers (FR)

( * ) Notice: Subject to any disclaimer, the term of this patent is extended or adjusted under 35 U.S.C. 154(b) by 0 days.

(21) Appl. No.: 10/897,751

(22) Filed: Jul. 23, 2004

(65) Prior Publication Data

US 2004/0259997 A1 Dec. 23, 2004

Related U.S. Application Data

(63) Continuation of application No. 09/763,111, filed on Feb. 16, 2001, now abandoned.

(30) Foreign Application Priority Data

Aug. 20, 1998 (FR) ................... 98 10586

(51) Int. Cl.
*C08K 3/18* (2006.01)

(52) U.S. Cl. ............ 524/430; 524/431; 524/432; 524/433

(58) Field of Classification Search ......... 524/430, 524/431, 432, 433
See application file for complete search history.

(56) References Cited

U.S. PATENT DOCUMENTS

| | | | | |
|---|---|---|---|---|
| 3,650,793 | A | * 3/1972 | Goodspeed et al. | ......... 106/438 |
| 3,876,442 | A | * 4/1975 | Thomas | ....................... 106/446 |
| 5,451,632 | A | 9/1995 | Okumura et al. | ............ 524/537 |
| 5,536,448 | A | 7/1996 | Takahashi et al. | ........... 252/520 |
| 6,433,068 | B1 | 8/2002 | Morrison et al. | ............ 524/505 |
| 6,624,235 | B1 | * 9/2003 | Waddell et al. | .............. 524/505 |

\* cited by examiner

*Primary Examiner*—Peter D. Mulcahy

(57) ABSTRACT

The invention concerns the use as anti-UV agent, in an elastomer rubber composition, of titanium dioxide particles of not more than 20 mn in size, said particles being coated with a silica, silico-aluminate or alumina layer. The invention also concerns rubber compositions comprising such an anti-UV agent and finished products based on said composition.

12 Claims, No Drawings

USE OF TITANIUM DIOXIDE AS ANTI-UV AGENT IN A RUBBER COMPOSITION

This application is a continuation of U.S. application Ser. No. 09/763,111, filed on Feb. 16, 2001 now abandoned.

The present invention relates to the use as a anti-UV agent, in rubber compositions, of particular titanium dioxide particles.

It also relates to the rubber compositions thus obtained.

Finally, it also relates to the finished articles based on these compositions, and especially to tire covers.

Rubber compositions that can be used for the manufacture of finished articles generally comprise, inter alia, one or more elastomers, a reinforcing filler and a coupling agent (allowing coupling between the elastomers and the surface of the reinforcing filler).

It is known to use systems for protecting against UV (ultraviolet radiation) in rubber compositions for the purpose of limiting the aging of the latter in light and therefore of preventing their mechanical properties from degrading.

However, the performance of known UV absorbers, particularly those, such as phenolic derivatives, employed in "light-colored" rubber compositions, i.e. those containing no carbon black, is not always good.

One of the aims of the invention is therefore to propose an anti-UV agent for rubber compositions which is effective, does not migrate to the surface, unlike organic UV absorbers, and can thus preferably retain its protective activity over time.

Another aim of the invention is also to be able to have an anti-UV agent that can be used in rubber compositions containing a reinforcing filler which is not predominantly carbon black, and in particular in "light-colored" rubber compositions, that is to say those containing no carbon black: thus, one of the objectives of the invention is therefore to propose a colorless UV stabilizer which is transparent and therefore does not stain the "light-colored" rubber compositions in which it is incorporated.

To achieve these aims, the subject of the present invention is the use as an anti-UV agent, in a rubber composition, of titanium dioxide particles having an average size of at most 80 nm and at least partially coated with at least one layer of at least one metal oxide, hydroxide or oxohydroxide.

The subject of the invention is also rubber compositions comprising at least one elastomer and at least one such anti-UV agent (or UV absorber).

Finally, another subject of the invention consists of the finished articles based on these rubber compositions, especially tire covers.

The invention relates firstly to the use as an anti-UV agent, in a rubber composition, of titanium dioxide particles having an average size of at most 80 nm and at least partially, preferably completely, coated with at least one layer of at least one metal oxide, hydroxide or oxohydroxide.

In general, the composition of this layer is chosen in such a way that it is chemically inert with respect to the elastomers included in the rubber composition to be protected and can react with the coupling agent usually included in this composition.

This layer may thus be a layer of at least one silicon and/or aluminum oxide, hydroxide or oxohydroxide.

It may thus be formed from alumina.

According to a preferred embodiment, it is formed from silica or from an aluminosilicate.

According to another preferred embodiment, it is formed from a layer of silica and of aluminum hydroxide or oxo- hydroxide, especially with an $SiO_2$ weight content of approximately 15% and an $Al_2O_3$ weight content of approximately 5%.

In general, the layer/titanium dioxide weight ratio is between 5 and 100%; usually it is at most 60%; the layer mass is measured by X-ray fluorescence on particles put into suspension.

This layer is rather very thin; it usually has a thickness of between 0.5 and 5 nm, in particular between 1 and 3 nm (measured by transmission electron microscopy (TEM)). In addition, it is generally dense.

It should be noted that said titanium dioxide particles may be at least partially coated:

with a first layer of at least one cerium and/or iron compound; and with a second layer as described above.

These cerium and/or iron compounds are precursors of cerium or iron oxide, that is to say they are thermally decomposable into cerium or iron oxide. They may be cerium or iron salts. The cerium compounds are preferred.

The titanium dioxide particles employed in the present invention have a number-average size of at most 80 nm, preferably between 20 and 70 nm (measured by transmission electron microscopy (TEM)). This average size is more particularly between 30 and 60 nm, especially between 40 and 50 nm.

Although the titanium dioxide constituting said particles may have a predominantly rutile crystal structure, advantageously it has a predominantly anatase crystal structure, i.e. 50% by weight of said titanium dioxide is of anatase structure. Preferably, 80%, or even almost 100%, by weight of said titanium dioxide is of anatase structure.

In general, said titanium dioxide particles have a BET specific surface area of at least 40 $m^2/g$, in particular at least 70 $m^2/g$, for example at least 100 $m^2/g$; it may be at most 250 $m^2/g$, especially at most 200 $m^2/g$. The BET specific surface area is determined by nitrogen adsorption according to the ASTM D 3663-78 standard drawn up based on the BRUNAUER-EMMET-TELLER method described in "The Journal of the American Chemical Society", Vol. 60, page 309, February 1938.

The titanium dioxide particles used in the present invention usually have a relative density of between 2.0 and 2.7.

Preferably, this relative density is between 2.3 and 2.7 when a layer of at least one cerium and/or iron compound is present and is between 2.0 and 2.4 when such a layer is not present.

Finally, they are preferably used in powder form.

The titanium dioxide particles used in the present invention are preferably prepared by precipitating at least one metal oxide, hydroxide or oxohydroxide onto the surface of titanium dioxide particles having an average size of at most 80 nm, generally having a predominantly anatase crystal structure and usually having a BET specific surface area of at least 200 $m^2/g$ and a relative density of between 2.3 and 2.7.

Optionally, at least one cerium and/or iron compound is precipitated beforehand onto the surface of these starting titanium dioxide particles.

Such precipitation may be carried out by:

introducing, into a dispersion of titanium dioxide particles having the above-mentioned characteristics, precursors of the cerium and/or iron compounds or metal oxides, hydroxides or oxohydroxides, generally in the form of aqueous salt solutions, and then modifying the pH in order to precipitate these compounds or oxides, hydroxides or oxohydroxides onto the titanium dioxide particles.

In general, this precipitation is carried out at a temperature of at least 50° C.

The titanium dioxide particles used according to the invention are not usually calcined, that is to say that they are not usually coated with cerium and/or iron oxides.

The cerium and/or iron compounds are generally cerium or iron salts or hydroxides. In the case of cerium, the compound may be a cerium salt chosen from cerium acetate, cerium sulfate or cerium chloride.

Likewise, when depositing iron, the compound may be an iron chloride, an iron sulfate or an iron acetate.

Cerium acetate and/or iron chloride are most often employed.

In general, the cerium and/or iron compounds are precipitated at a pH of between 4 and 10.

It is possible to heat the particle dispersion during this step.

When precipitating silica and an aluminum hydroxide or oxohydroxide, the precipitation may be carried out at acid or basic pH. The pH may be controlled by adding an acid such as sulfuric acid or by simultaneously and/or alternately introducing an alkaline silicon compound and an acid aluminum compound. In this case, the pH is preferably between 8 and 10.

The silica may be precipitated from a silicon salt such as an alkaline silicate.

The aluminum hydroxide or oxohydroxide may be precipitated from an aluminum salt such as alumina sulfate, sodium aluminate, basic aluminum chloride or aluminum diacetate.

After precipitation, the particles obtained after the treatment may be recovered and washed, one or more times, before being dried or, preferably, being redispersed. This step may be carried out by centrifuging and washing or by ultrafiltration washing. The pH of the washing water is advantageously about 5.5. Next, optionally after one or more further washings of this type, the particles are preferably redispersed, generally in water, and then dried, usually at a temperature of less than 110° C.; advantageously, this drying step consists in drying a suspension preferably containing 8 to 30% by weight of said particles by means of an atomizer, for example an APV-type atomizer, with an exit temperature of generally less than 110° C.

The starting titanium dioxide particles have a number-average size of at most 80 nm, preferably between 20 and 70 nm (measured by transmission electron microscopy (TEM)). This average size is more particularly between 30 and 60 nm, especially between 40 and 50 nm.

Although the titanium dioxide constituting said starting particles may have predominantly a rutile crystal structure, advantageously it has a predominantly anatase crystal structure, i.e. 50% by weight of said titanium dioxide is of anatase structure. Preferably, 80%, or even almost 100%, by weight of said titanium dioxide is of anatase structure.

The starting particles usually have a BET specific surface area of at least 200 m²/g, for example at least 250 m²/g.

In general, their relative density is between 2.3 and 2.7. This relative density is especially given by the following formula:

$$\text{relative density} = \frac{1}{1/\rho + Vi}$$

in which:

ρ is the relative density of anatase, i.e. 3.8;

Vi is the volume provided by the intraparticle pores and is measured by the BJH method. The expression "volume measured by the BJH method" is understood to mean the volume measured using the BARRETT-JOYNER-HELENDA method described in the article entitled "Texture des solides poreux ou divisés [Texture of porous or divided solids]" in the work *Techniques de l'Ingénieur*, pp. 3645-1 to 3645-13.

To measure the volume provided by the intraparticle pores of the particles according to the invention, when they are in the form of a dispersion, it is essential to follow the measurement protocol consisting in removing the liquid phase of the dispersion and then vacuum-drying the particles at a temperature of 150° C. for at least 4 hours.

Such starting particles may be obtained by the hydrolysis of at least one titanium compound A in the presence of at least one compound B chosen from:

(i) organic phosphoric acids of the following formulae:

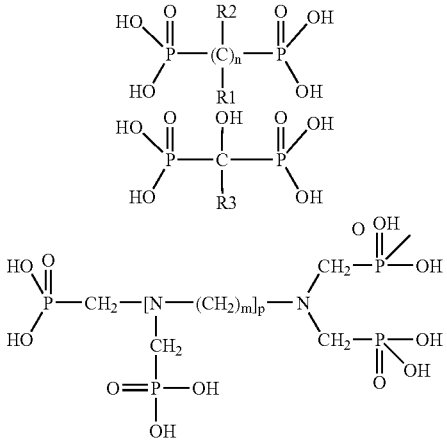

in which n and m are integers between 1 and 6 and p is an integer between 0 and 5, R1, R2, R3, which are identical or different, representing a hydroxyl, amino, aralkyl, aryl or alkyl group or hydrogen;

(ii) acids which have:
either a carboxyl group and at least two hydroxyl and/or amine groups,
or at least two carboxyl groups and at least one hydroxyl and/or amine group;

(iii) compounds capable of releasing sulfate ions in acid medium;

(iv) salts of the abovementioned acids; and in the presence of titanium dioxide, usually anatase, seeds advantageously having a size of at most 8 nm and in a (TiO₂ present in the seeds)/(titanium present before introducing the seeds into the hydrolysis medium, expressed as TiO₂) weight ratio of preferably between 0.01 and 3%.

The starting solution, intended to be hydrolyzed, is preferably completely aqueous; optionally, another solvent may be added, for example an alcohol, as long as the titanium compound A and the compound B used are then substantially soluble in this mixture.

As titanium compound A, a compound chosen from titanium halides, oxyhalides or alkoxides, sulfates, more particularly synthetic sulfates, is in general used.

The expression "synthetic sulfates" is understood to mean titanyl sulfate solutions produced by ion exchange using very pure titanium chloride solutions or by the reaction of sulfuric acid on a titanium alkoxide.

It is preferred to use titanium compounds of the titanium halide or oxyhalide type. The titanium halides or oxyhalides more particularly used in the present invention are titanium fluorides, chlorides, bromides and iodides (or oxyfluorides, oxychlorides, oxybromides and oxyiodides, respectively).

According to a particularly preferred embodiment, the titanium compound is titanium oxychloride $TiOCl_2$.

The amount of titanium compound A present in the solution to be hydrolyzed is not critical.

The initial solution additionally contains at least one compound B as defined above. Mention may be made, as nonlimiting examples of compounds B, of in particular:

hydroxypolycarboxylic acids and more particularly hydroxydicarboxylic or hydroxytricarboxylic acids, such as citric acid, maleic acid and tartaric acid;

(polyhydroxy)monocarboxylic acids, such as, for example, glucoheptonic acid and gluconic acid;

poly(hydroxycarboxylic) acids, such as, for example, tartaric acid;

dicarboxylic monoacids and their corresponding amides, such as, for example, aspartic acid, asparagine and glutamic acid;

hydroxylated or nonhydroxylated monocarboxylic amino acids, such as, for example, lysine, serine and threonine;

aminotri(methylenephosphonate), ethylene-diaminotetra (methylenephosphonate), triethylene-tetraminohexa (methylenephosphonate), tetraethylene-pentamino-hepta (methylenephosphonate) or pentaethylene-hexaminoocta(methylenephosphonate);

methylenediphosphonate, 1,1'-ethylenedi-phosphonate, 1,2-ethylenediphosphonate, 1,1'-propylene-diphosphonate, 1,3-propylenediphosphonate, 1,6-hexa-methylenediphosphonate, 2,4-dihydroxypentamethylene-2,4-diphosphonate, 2,5-dihydroxyhexamethylene-2,5-diphosphonate, 2,3-dihydroxybutylene-2,3-diphosphonate, 1-hydroxybenzyl-1,1'-diphosphonate, 1-aminoethylene-1-1'-diphosphonate, hydroxymethyl-enediphosphonate, 1-hydroxyethylene-1,1'-diphosphonate, 1-hydroxy-propylene-1-1'-diphosphonate, 1-hydroxybutylene-1-1'-diphosphonate or 1-hydroxyhexamethylene-1,1'-diphosphonate.

As already indicated, it is also possible to use, as compound B, all the salts of the above-mentioned acids. In particular, these salts are either alkali metal salts, more particularly sodium salts, or ammonium salts.

These compounds can also be chosen from sulfuric acid and ammonium or potassium sulfates, and the like.

The compounds B as defined above are generally hydrocarbon-comprising compounds of aliphatic type. In this case, the length of the main hydrocarbon-comprising chain preferably does not exceed 15 carbon atoms, for example, 10 carbon atoms. The preferred compound B is citric acid.

The amount of compound B is not critical. The molar concentration of compound B with respect to that of the titanium compound A is generally between 0.2 and 10% and preferably between 1 and 5%.

Finally, the starting solution comprises titanium dioxide seeds used in a specific way.

Thus, the titanium dioxide seeds used advantageously have a size of less than 8 nm, measured by X-ray diffraction. Use is preferably made of titanium dioxide seeds having a size of between 3 and 5 nm.

Subsequently, the ratio by weight of the titanium dioxide present in the seeds to the titanium present in the hydrolysis medium before introduction of the seeds, that is to say contributed by the titanium compound A, and expressed as $TiO_2$ is between 0.01 and 3%. This ratio may be between 0.05 and 1.5%. Combining these two conditions with respect to the seeds (size and ratio by weight), together with the process as described above, allows the final size of the titanium dioxide particles to be precisely controlled, one seed content being associated with one particle size.

Titanium dioxide seeds in the anatase form are generally used, so as to induce precipitation of the titanium dioxide in the anatase form. Usually, due to their small size, these seeds instead exist in the form of poorly crystallized anatase. The seeds are usually in the form of an aqueous suspension composed of titanium dioxide. They can generally be obtained in a known way by a process of neutralizing a titanium salt by a base.

The next step consists in hydrolyzing this starting solution by any means known to a person skilled in the art and generally by heating. In the latter case, the hydrolysis can preferably be carried out at a temperature greater than or equal to 70° C. It is also possible to operate, firstly, at a temperature below the boiling temperature of the medium and, then, to maintain the hydrolysis medium level at the boiling temperature.

Once hydrolysis has been carried out, the titanium dioxide particles obtained are recovered by separation of the precipitated solid from the mother liquors before being redispersed in a liquid medium so as to obtain a titanium dioxide dispersion. This liquid medium can be acidic or basic. It is preferably a basic solution, for example an aqueous sodium hydroxide solution. It is from this dispersion that the step of precipitating the metal oxides, hydroxides or oxohydroxides, as indicated above, will be carried out.

According to a specific alternative form, after the recovery of the particles obtained following the hydrolysis and before they are redispersed, the particles are neutralized and subjected to at least one washing operation. The particles can be recovered, for example by centrifuging the solution resulting from the hydrolysis; they are subsequently neutralized with a base, for example a sodium hydroxide or aqueous ammonia solution, they are then washed by redispersing them in an aqueous solution, and finally the particles are separated from the aqueous washing phase. After optionally one or more other washing operations of the same type, the particles are redispersed in a liquid or basic solution before the step of precipitating the metal oxides, hydroxides or oxohydroxides.

The mass of titanium dioxide particles used in the invention is usually between 0.5 and 8%, preferably between 1 and 5%, of the total mass of the rubber composition.

The rubber compositions in which said titanium dioxide particles are used as anti-UV agents are, in general, based on one or more elastomers.

More particularly, among suitable elastomers may be mentioned the elastomers having a glass transition temperature of between −150° C. and +20° C.

As possible elastomers, mention may especially be made of diene elastomers.

For example, mention may be made of natural rubber, polymers or copolymers deriving from aliphatic or aromatic monomers; comprising at least one unsaturated group (such as, especially, ethylene, propylene, butadiene, isoprene and styrene), polybutyl acrylate, or combinations thereof; mention may also be made of silicon elastomers and halogenated elastomers.

The rubber compositions are sulfur vulcanizable.

The invention also relates to the rubber compositions which furthermore include at least one reinforcing filler (for example carbon black, alumina and/or precipitated silica) and, optionally, at least one coupling agent and/or at least one coating agent.

Preferably, the rubber composition includes precipitated, advantageously highly dispersible, silica as reinforcing filler.

In general, this reinforcing filler is formed predominantly, by weight, from precipitated silica, preferably highly dispersible precipitated silica, for example that described in applications EP 0520862, WO 95/09127 and WO 95/09128.

The invention is even more advantageous when the rubber composition is a "light-colored" composition, that is to say it contains no carbon black.

The rubber composition may also include, inter alia, an organic antioxidant.

The invention also relates to the finished articles based on the rubber compositions described above. As finished articles, mention may be made of tire covers, particularly the sidewalls and the tread of tires, shoe soles, etc.

The following examples illustrate the invention without however limiting the scope thereof.

EXAMPLE 1

Preparation of titanium dioxide particles having an average size of 60 nm, with surface treatment.

1-Hydrolysis

The following were added in succession to 394.7 g of a 1.9 mol/kg titanium oxychloride solution:
42.02 g of 36% hydrochloric acid;
4.73 g of citric acid;
574.1 g of purified water;
5.68 g (0.1%/$TiO_2$) of a suspension containing 1.06% by weight of anatase seeds having a size of between 5 and 6 nm.

The mixture was heated to boiling and kept there for 3 h.

2-Recovery of the Particles and Redispersion

Next, the solution was filtered and the particles obtained were washed with water until the chlorides were completely removed. The particles were then redispersed at pH 9 (controlled by the addition of sodium hydroxide), the dispersion obtained having a solids content of 20% by weight.

This dispersion was stable. The average size of the particles measured by TEM was 60 nm. X-ray analysis shows that the particles were based on titanium dioxide only in the anatase form.

Their BET specific surface area was 300 m$^2$/g.

Their relative density was 2.52 (Vi=0.14 cm$^3$/g).

3-Surface Treatment of the Particles 750 g of the starting dispersion were introduced into a reactor fitted with a stirrer. Then 750 g of purified water were added and the temperature raised to 90° C. The pH of the dispersion was adjusted to 9 by adding sodium hydroxide.

Firstly, a sodium silicate solution (solution containing 335 g/l of $SiO_2$) containing the equivalent of 22.5 g of $SiO_2$ and an 80 g/l sulfuric acid solution were continuously and simultaneously introduced in an amount such that the pH was maintained at 9. The rate of introduction of the sodium silicate solution was set at 2 ml/min. Next, a maturing time of 1 hour at 90° C. was respected.

Next, an aqueous sodium aluminate solution (240 g/l $Al_2O_3$ solution) containing the equivalent of 7.5 g of $Al_2O_3$ was continuously introduced at pH 9 and at 90° C. The rate of introduction of the aluminate solution was 2 ml/min., the pH being controlled at 9 by simultaneously introducing a 6N aqueous sulfuric acid solution.

When the reactants had been introduced, the dispersion was matured for 2 h at 90° C. and then cooled.

The dispersion thus prepared was centrifuged. The cake then obtained was washed three times with water and then redispersed in water. The pH of the dispersion obtained was about 7.7 and the dispersion had a solids content of 10% by weight. The dispersion was then dried by means of an APV-type atomizer, in turbine configuration, the entry temperature being 250° C., the exit temperature being 90° C. and the feed rate being about 20 kg/h.

4-Characteristics of the Particles Obtained

The average size of the particles measured by TEM was 60 nm.

Their BET specific surface area was 135 m$^2$/g.

The $SiO_2$ weight content, measured by X-ray fluorescence, was 14.9% and that of $Al_2O_3$ was 5%, with respect to the titanium dioxide.

The relative density of the particles prepared was 2.15.

EXAMPLE 2

Preparation of titanium dioxide particles having an average size of 45 nm, with surface treatment.

1-Hydrolysis

The following were added in succession to 394.7 g of a 1.9 mol/kg titanium oxychloride solution:
42.02 g of 36% hydrochloric acid;
4.73 g of citric acid;
574.1 g of purified water;
11.36 g (0.2%/$TiO_2$) of a suspension containing 1.06% by weight of anatase seeds having a size of between 5 and 6 nm.

The mixture was heated to boiling and kept there for 3 h.

2-Recovery of the Particles and Redispersion

Next, the solution was filtered and the particles obtained were washed with water until the chlorides were completely removed. The particles were then redispersed at pH 9 (controlled by the addition of sodium hydroxide), the dispersion obtained having a solids content of 20% by weight.

This dispersion was stable. The average size of the particles measured by TEM was 60 nm. X-ray analysis shows that the particles were based on titanium dioxide only in the anatase form.

Their BET specific surface area was 300 m$^2$/g.

Their relative density was 2.52 (Vi=0.14 cm$^3$/g).

3-Surface Treatment of the Particles 750 g of the starting dispersion were introduced into a reactor fitted with a stirrer. Then 750 g of purified water were added and the temperature raised to 90° C. The pH of the dispersion was adjusted to 9 by adding sodium hydroxide.

Firstly, a sodium silicate solution (solution containing 335 g/l of $SiO_2$) containing the equivalent of 22.5 g of $SiO_2$ and an 80 g/l sulfuric acid solution were continuously and simultaneously introduced in an amount such that the pH was maintained at 9. The rate of introduction of the sodium silicate solution was set at 2 ml/min. Next, a maturing time of 1 hour at 90° C. was respected.

Next, an aqueous sodium aluminate solution (240 g/l $Al_2O_3$ solution) containing the equivalent of 7.5 g of $Al_2O_3$ was continuously introduced at pH 9 and at 90° C. The rate of introduction of the aluminate solution was 2 ml/min., the pH being controlled at 9 by simultaneously introducing a 6N aqueous sulfuric acid solution.

When the reactants had been introduced, the dispersion was matured for 2 h at 90° C. and then cooled.

The dispersion thus prepared was centrifuged. The cake then obtained was washed three times with water and then redispersed in water. The pH of the dispersion obtained was about 7.7 and the dispersion had a solids content of 10% by weight. The dispersion was then dried by means of an APV-type atomizer, in turbine configuration, the entry temperature being 250° C., the exit temperature being 90° C. and the feed rate being about 20 kg/h.

4-Characteristics of the Particles Obtained

The average size of the particles measured by TEM was 45 nm.

Their BET specific surface area was 150 m²/g.

The $SiO_2$ weight content, measured by X-ray fluorescence, was 14.9% and that of $Al_2O_3$ was 5%, with respect to the titanium dioxide.

The relative density of the particles prepared was 2.15.

EXAMPLE 3

The following formulations for industrial rubber were prepared (Table 1: compositions in parts by weight) containing or not containing titanium dioxide particles obtained in Example 1.

TABLE 1

|  | Compound 1 | Compound 2 | Compound 3 | Compound 4 | Compound 5 |
|---|---|---|---|---|---|
| SBR[1] | 100 | 100 | 100 | 100 | 100 |
| $SiO_2$ filler[2] | 50 | 50 | 50 | 50 | 50 |
| Si69 silane[3] | 5 | 5 | 5 | 5 | 5 |
| $TiO_2$ (60 nm)[4] |  | 1 | 2 |  | 2 |
| antioxidant[5] |  |  |  | 2 | 2 |

[1]Styrene-butadiene copolymer of the Buna VSL 5525-0 type;
[2]Filler formed by a precipitated silica of Example 12 of EP-A-0520862;
[3]Filler/rubber coupling agent (sold by Degussa);
[4]UV stabilizer obtained from the above Example 1;
[5]Non-staining phenolic antioxidant called Wingstay L.

The compounds were produced using a laboratory Brabender extruder and then pressed at 150° C. for 50 minutes in the form of a plaque 2 mm in thickness.

The formulations were aged for 89 hours under UV-A (using a UV CON ATLAS apparatus), only one face being exposed. The temperature in the chamber was 57° C.

The determination of the tensile behavior of the unexposed formulations and formulations exposed to the UV-A was carried out at a pull rate of 8 mm/min.

Table 2 below gives the tensile strength values ($\sigma_b$) and the strain (elongation) at break ($\epsilon_b$), together with the stress values at a strain of 10% ($\sigma_{10\%}$), the change in the stress values at a strain of 10% illustrating the surface hardening of the material.

The values under the headings with the suffix (UV) are those of the formulations exposed to UV-A for 89 hours at 57° C.

The values under the headings with the suffix (0) are those of the formulations not exposed to UV-A (or controls), these formulations having, however, also been kept for 89 hours at 57° C., but in the dark.

TABLE 2

|  | $\epsilon_b(0)$ | $\epsilon_b(UV)$ | $\sigma_b(0)$ | $\sigma_b(UV)$ | $\sigma_{10\%}(0)$ | $\sigma_{10\%}(UV)$ |
|---|---|---|---|---|---|---|
| Compound 1 | 474 | 30 | 2.45 | 1.79 | 1.22 | 2.26 |
| Compound 2 | 421 | 148 | 2.25 | 2.45 | 1.21 | 1.91 |
| Compound 3 | 440 | 239 | 2.24 | 2.34 | 1.29 | 1.75 |
| Compound 4 | 574 | 42 | 2.76 | 1.96 | 1.47 | 2.24 |
| Compound 5 | 447 | 307 | 2.03 | 2.10 | 1.25 | 1.78 |

$\epsilon_b$ expressed in %
$\sigma_b$ and $\sigma_{10\%}$ expressed in MPa
test piece (specimen) thickness = 1.6 mm.

The efficacy as an anti-UV agent of the titanium dioxide particles obtained in Example 1 was determined.

EXAMPLE 4

The following formulations for industrial rubber (Table 3: compositions in parts by weight) containing or not containing titanium dioxide particles obtained in Example 1 ($TiO_2$ (60 nm)) or in Example 2 ($TiO_2$(45 nm)) were prepared.

TABLE 3

|  | Compound 1 | Compound 2 | Compound 3 | Compound 4 | Compound 5 |
|---|---|---|---|---|---|
| SBR[1] | 100 | 100 | 100 | 100 | 100 |
| $SiO_2$ filler[2] | 50 | 50 | 50 | 50 | 50 |
| Si69 silane[3] | 5 | 5 | 5 | 5 | 5 |
| $TiO_2$ (60 nm)[4] |  | 2 | 4 |  |  |
| $TiO_2$ (45 nm)[5] |  |  |  | 2 | 4 |
| antioxidant[6] | 2 | 2 | 2 | 2 | 2 |

[1]Styrene-butadiene copolymer of the Buna VSL 5525-0 type;
[2]Filler formed by a precipitated silica of Example 12 of EP-A-0520862;
[3]Filler/rubber coupling agent (sold by Degussa);
[4]anti-UV agent obtained from the above Example 1;
[5]anti-UV agent obtained from the above Example 2;
[6]Non-staining phenolic antioxidant called Wingstay L.

The compounds were produced using a laboratory Brabender extruder and then pressed at 150° C. for 50 minutes in the form of a plaque 2 mm in thickness.

The formulations were aged for 89 hours under UV-A (using a UV CON ATLAS apparatus), only one face being exposed. The temperature in the chamber was 57° C.

The determination of the tensile behavior of the unexposed formulations and formulations exposed to the UV-A was carried out at a pull rate of 8 mm/min.

Table 4 below gives the tensile strength values ($\sigma_b$) and the strain (elongation) at break ($\epsilon_b$), together with the stress values at a strain of 10% ($\sigma_{10\%}$), the change in the stress values at a strain of 10% illustrating the surface hardening of the material.

The values under the headings with the suffix (UV) are those of the formulations exposed to UV-A for 89 hours at 57° C.

The values under the headings with the suffix (0) are those of the formulations not exposed to UV-A (or controls), these formulations having, however, also been kept for 89 hours at 57° C., but in the dark.

TABLE 4

|  | $\epsilon_b(0)$ | $\epsilon_b(UV)$ | $\sigma_b(0)$ | $\sigma_b(UV)$ | $\sigma_{10\%}(0)$ | $\sigma_{10\%}(UV)$ |
|---|---|---|---|---|---|---|
| Compound 1 | 561 | 35 | 1.65 | 2.14 | 1.30 | 2.60 |
| Compound 2 | 445 | 331 | 1.81 | 2.46 | 1.27 | 2.00 |
| Compound 3 | 520 | 320 | 1.83 | 2.12 | 1.32 | 1.83 |
| Compound 4 | 440 | 305 | 1.66 | 1.89 | 1.19 | 1.86 |
| Compound 5 | 507 | 306 | 2.07 | 2.48 | 1.35 | 2.01 |

$\epsilon_b$ expressed in %
$\sigma_b$ and $\sigma_{10\%}$ expressed in MPa
test piece (specimen) thickness = 1.2 mm It may be seen that the performance obtained for the two products of different average size is quite similar and that the increase in concentration does not produce significantly better results.

However, it should be noted that the transparency of the formulations containing titanium dioxide having an average size of 45 nm is slightly higher than that of the formulations containing titanium dioxide having an average size of 60 nm.

The invention claimed is:

1. A process for protecting a rubber composition against UV radiation, wherein said rubber composition containing precipitated silica as reinforcing filler and no carbon black, said process comprising the step of adding to said composition a protecting amount against UV radiation of titanium dioxide particles having an average size of at most 80 nm and at least partially coated with a layer of at least one metal oxide, hydroxide or oxohydroxide.

2. A process as claimed in claim 1, wherein said layer is a layer of at least one silicon or aluminum oxide, hydroxide or oxohydroxide.

3. A process as claimed in claim 2, wherein said layer is formed from silica, an aluminosilicate or alumina.

4. A process as claimed in claim 1, wherein said titanium dioxide particles have an average size of between 20 and 70 nm.

5. A process as claimed in claim 1, wherein the titanium dioxide has an anatase crystal structure.

6. A process as claimed in claim 1, wherein said titanium dioxide particles have a BET specific surface area of at least 40 $m^2/g$.

7. A process as claimed in claim 1, wherein said particles are in powder form.

8. A process as claimed in claim 1, wherein said rubber composition comprises at least one elastomer, having a glass transition temperature of between −150° C. and +20° C.

9. A process as claimed in claim 1, wherein said rubber composition furthermore includes at least one coupling agent or at least one coating agent.

10. A process as claimed in claim 1, wherein said rubber composition further comprises at least one organic antioxidant.

11. A process as claimed in claim 1, wherein between 0.5 and 8% by mass relative to the total mass of said rubber composition, of titanium dioxide particles is added to said rubber composition.

12. A process as claimed in claim 11, wherein between 1and 5% by mass relative to the total mass of said rubber composition, of titanium dioxide particles is added to said rubber composition.

* * * * *

UNITED STATES PATENT AND TRADEMARK OFFICE
CERTIFICATE OF CORRECTION

PATENT NO. : 7,179,857 B2  
APPLICATION NO. : 10/897751  
DATED : February 20, 2007  
INVENTOR(S) : Catherine Enjalbert et al.

Page 1 of 1

It is certified that error appears in the above-identified patent and that said Letters Patent is hereby corrected as shown below:

On the Title page, Related U.S. Application Data and Foreign Application Priority Data Should read:

Related U.S. Application Data

(63) Continuation of Application No. 09/763,111, filed on Feb. 16, 2001, now abandoned, which is a 371 of international application No. PCT/FR99/02023, filed on Aug. 20, 1999.

(30) Foreign Application Priority Data

Aug. 20, 1998 (FR)                      98/10586

Signed and Sealed this  
Twenty-ninth Day of March, 2016

Michelle K. Lee  
*Director of the United States Patent and Trademark Office*